US010666687B2

(12) United States Patent
Kiefer et al.

(10) Patent No.: US 10,666,687 B2
(45) Date of Patent: May 26, 2020

(54) MODULARIZED SOFTWARE SYSTEM FOR MANAGING A PLURALITY OF DISPARATE NETWORKS

(71) Applicant: NECTAR HOLDINGS, INC., Jericho, NY (US)

(72) Inventors: Matthew Kiefer, Seaford, NY (US); Joseph Fuccillo, Pleasantville, NY (US); Edmond Baydian, Massapequa, NY (US)

(73) Assignee: NECTAR HOLDINGS, INC., Jericho, NY (US)

( * ) Notice: Subject to any disclaimer, the term of this patent is extended or adjusted under 35 U.S.C. 154(b) by 0 days.

(21) Appl. No.: 16/241,555

(22) Filed: Jan. 7, 2019

(65) Prior Publication Data

US 2019/0141082 A1    May 9, 2019

Related U.S. Application Data

(63) Continuation of application No. 15/898,344, filed on Feb. 16, 2018, now Pat. No. 10,178,135, which is a
(Continued)

(51) Int. Cl.

| | |
|---|---|
| G06F 15/16 | (2006.01) |
| H04L 29/06 | (2006.01) |
| H04L 12/26 | (2006.01) |
| H04L 12/24 | (2006.01) |
| H04L 12/721 | (2013.01) |

(Continued)

(52) U.S. Cl.
CPC .............. *H04L 63/20* (2013.01); *H04L 41/00* (2013.01); *H04L 43/10* (2013.01); *H04L 45/34* (2013.01); *H04L 63/02* (2013.01); *H04L 63/08* (2013.01); *H04L 29/06312* (2013.01); *H04L 29/12301* (2013.01); *H04L 41/0213* (2013.01); *H04L 41/0233* (2013.01); *H04L 41/0604* (2013.01); *H04L 41/22* (2013.01);
(Continued)

(58) Field of Classification Search
CPC ......... H04L 63/20; H04L 43/10; H04L 63/08; H04L 63/02; H04L 45/34; H04L 41/00; H04L 61/302; H04L 61/1511; H04L 47/785; H04L 29/12301; H04L 29/06312; H04L 41/5067; H04L 41/22; H04L 41/0604; H04L 41/0233; H04L 41/0213
USPC ........................................................ 709/201
See application file for complete search history.

(56) References Cited

U.S. PATENT DOCUMENTS

| | | | | |
|---|---|---|---|---|
| 6,760,343 B1 * | 7/2004 | Krishnamurthy | .... | H04Q 3/0025 370/338 |
| 7,417,663 B2 * | 8/2008 | Yang | ...................... | H04N 7/152 348/14.08 |

(Continued)

*Primary Examiner* — Krisna Lim

(57) ABSTRACT

Converged network management application and system is provided that delivers a management platform as a service that can view and/or manage all managed networks in the aggregate, or any one of them individually (including individual devices within the managed networks), in a secure and efficient manner, providing continuously available intelligence in real time on the managed networks and systems, and overcoming integration issues including conflicting address schemas, the need to avoid unnecessary infrastructure, and the need acquire all necessary information in real time within applicable memory and bandwidth constraints.

10 Claims, 14 Drawing Sheets

Related U.S. Application Data continuation of application No. 14/816,056, filed on Aug. 2, 2015, now Pat. No. 9,900,348, which is a continuation of application No. 14/043,437, filed on Oct. 1, 2013, now Pat. No. 9,100,333, which is a continuation of application No. 12/512,136, filed on Jul. 30, 2009, now Pat. No. 8,578,048.

(60) Provisional application No. 61/085,407, filed on Jul. 31, 2008.

(51) Int. Cl.
*H04L 29/12* (2006.01)
*H04L 12/915* (2013.01)

(52) U.S. Cl.
CPC ........ *H04L 41/5067* (2013.01); *H04L 47/785* (2013.01); *H04L 61/1511* (2013.01); *H04L 61/302* (2013.01)

(56) References Cited

U.S. PATENT DOCUMENTS

| | | | | |
|---|---|---|---|---|
| 7,612,654 | B2 * | 11/2009 | Bender | G06Q 10/06 340/292 |
| 8,165,091 | B2 * | 4/2012 | Nix | H04L 29/125 370/331 |
| 2004/0037313 | A1 * | 2/2004 | Gulati | H04L 12/56 370/465 |
| 2007/0143842 | A1 * | 6/2007 | Turner | G06F 21/552 726/22 |
| 2008/0297307 | A1 * | 12/2008 | Parker | G08B 27/006 340/7.5 |
| 2009/0016270 | A1 * | 1/2009 | Tsirtsis (Georgios) | H04W 8/065 370/328 |
| 2009/0177863 | A1 * | 7/2009 | Rehman | H04L 12/6418 712/30 |
| 2016/0255139 | A1 * | 9/2016 | Rathod | H04L 67/10 709/203 |

* cited by examiner

| time | eventId | localdeviceName | service | agentIp | description |
|---|---|---|---|---|---|
| e) | CMResolved | HHR:CO-TRK-041V708 | CO-TRK | 10.14.0.11 | |
| n) | DependencyTree | MedPro | | | |
| n) | DependencyTree | MedPro_HHR_NYC_ | | | |
| n) | DependencyTree | Messaging | | | |
| n) | DependencyTree | Trunk_Group_MASQ | | | |
| n) | DependencyTree | Trunk_Group_POTS | | | |
| n) | DependencyTree | Trunk_Group_Verizo | | | |
| n) | DependencyTree | Cian 100 | | | |
| n) | DependencyTree | Cian 200 | | | |
| n) | DependencyTree | Cian 70 | | | |
| n) | DependencyTree | Cian HHR_NYC_VOI | | | |
| | | HHR SME A "E and ala SME | | 10.14.0.11 | |

Time Range: 6 Hours

| delay | text time | last text time | eventId | location |
|---|---|---|---|---|
| false | 06/10/08 12:37:47 PM (T) | 06/10/08 12:37:47 PM (T) | CMResolved | HHRNYOMain |
| 000 | 06/10/08 12:36:00 PM (T) | 06/10/08 12:36:00 PM (T) | CMResolved | HHRNYOMain |
| 000 | 06/10/08 12:35:06 PM (T) | 06/10/08 12:35:06 PM (T) | CMMinor | HHRNYOMain |
| 000 | 06/10/08 12:32:09 PM (T) | 06/10/08 12:32:09 PM (T) | CMMinor | HHRNYOMain |

MODULARIZED SOFTWARE SYSTEM FOR MANAGING A PLURALITY OF DISPARATE NETWORKS

CROSS-REFERENCE TO RELATED APPLICATIONS

This application is a continuation of U.S. patent application Ser. No. 15/898,344, filed Aug. 16, 2018, which is a continuation of U.S. patent application Ser. No. 14/816,056, filed Aug. 2, 2015, now patented as U.S. Pat. No. 9,900,348, issued Feb. 20, 2018, which is a continuation of U.S. patent application Ser. No. 14/043,437, filed Oct. 1, 2013, now patented as U.S. Pat. No. 9,100,333, issued Aug. 4, 2015, which is a continuation of U.S. patent application Ser. No. 12/512,136, filed Jul. 30, 2009, now patented as U.S. Pat. No. 8,578,048, issued Nov. 2, 2013, which claims the benefit of U.S. Provisional Application No. 61/085,407, filed Jul. 31, 2008. This application hereby incorporates by reference the entire disclosures of each of the above-specified patents and patent applications, as well as the entire disclosure of each of the published versions of the patent applications that commonly claimed priority to said U.S. Provisional Patent Application Ser. No. 61/085,407, i.e., U.S. Pat. Pub. No. 2010/0030895, U.S. Pat. Pub. No. 2010/0030883, U.S. Pat. Pub. No. 2010/0030915, and U.S. Pat. Pub. No. 2010/0030884.

BACKGROUND

Field of the Disclosure

The present disclosure is in the field of network management and support. More specifically, the disclosure provides a system for remotely and securely monitoring and managing a plurality of disparate networks and systems, which, among other capabilities, can monitor events in real time, selectively or globally, throughout all managed networks, and access and manage individual network elements to any internal depth within each managed network, without requiring special access to the network, and without regard to the architectures, business purposes or addressing schemas of or within the managed networks.

Description of the Related Art

Modern data and communications networks are highly complex and require substantial management in order to keep those networks and the services they provide up and running smoothly. Among the activities within the scope of "network management" is monitoring a network and the health of its systems and components in order to spot problems as soon as possible, preferably before users or business processes are affected. Other activities within the scope of such management include operation, administration, maintenance, and provisioning.

Numerous systems exist for providing the types of management and support referenced above, but are limited to doing so on a network-by-network basis.

Many organizations require complex networks, but lack the resources to manage them, lack the budget to acquire a fully-outfitted management system for their individual network, or believe that they could better economize if it were possible to outsource this activity. An organization tasked with managing networks for a plurality of disparate customers will face multiplied expenses, however, if it must provide a separate management infrastructure for each customer. A need therefore exists for systems capable of remotely but centrally and securely managing a plurality of disparate networks, meaning networks under different ownership or management, or otherwise characterized by having different architectures, different management policies, different business purposes, and/or different overall design.

A large number of access methods exist to support network and network device management within, or directed to, any one given network. Such access methods, oriented toward individual networks, include Simple Network Management Protocol (SNMP), Command Line Interfaces (CLIs), custom XML, CMIP, Windows Management Instrumentation (WMI), Transaction Language 1, CORBA, netconf, the Java Management Extensions (JMX), the Java Messaging Service (JMS), SOAP, and XML-RPC. These are primarily low-level protocols that help get management jobs done, but do not address the issues involved in managing a plurality of disparate networks.

As mentioned above, some systems currently exist for managing individual enterprise-level networks. Popular systems include Open View® from Hewlett-Packard Corporation, Unicenter® from Computer Associates, and IBM Tivoli® Framework. However, these systems were developed primarily to manage individual enterprise-level networks, and have only limited capabilities for managing completely disparate networks. Another example of such a system is the Solarwinds® Orion® Network Performance Monitor. However, the Solarwinds system uses stateless communications methods and is directed to monitoring rather than remote management of individual devices within the monitored networks. A somewhat different approach is that of Jumpnode Systems LLC, as reflected by U.S. Pat. Pub. No. 2006/0218267 AI, which provides a hardware appliance that can be installed in a local network to monitor local network events and communicates the collected information to a remote management center. However, the Jumpnode® appliances track network events locally and are therefore vulnerable to loss of connectivity and consequent data loss and security risks. Moreover, each of the hardware appliances must have its own "Internet drop" (or other access point (such as a modem port) directly accessible from outside the local network) to make the requisite connections to the remote management facility, and the appliances rely on stateless communications and polling, which does not provide for real-time data acquisition.

Tools also exist for internetwork communications, such as proxy servers, remote control software systems such as GoToMyPC® (now owned by Citrix Systems), and Alarmnet™ (by Honeywell Security Systems). However, these tools do not provide a way to communicate beyond the first level of a managed network without special arrangements, such as special credentials, VPN access, a special opening in a firewall, etc., or manual construction of sockets and tunnels, allowing deeper access. They also do not provide a mechanism for reducing the enormous volume of data that might result from indiscriminately monitoring all events across a plurality of managed networks and systems, other than opting to view only one data source at a time. In addition, centralized polling is often performed from a management network separate from end-user community networks, resulting in a lack of fidelity of that end-user's local perspective of the availability of polled resources. Furthermore, measuring from a distance can introduce artificial statistics in the actual measurements taken, such as latency.

Similarly, tools such as Network Address Translation (NAT) exist to isolate the inner workings and resources of networks from outside view and access, and NAT systems can be configured to forward messages to specified internal network destinations and resources. Examples of this approach are reflected in U.S. Pat. No. 6,581,108 (assigned to Lucent Technologies, Inc.) and U.S. Pat. Pub. Nos. 2005/0271047 AI and 2006/0029083 AI. However, such facilities are of limited utility for remote management. NAT connections initiated from inside the NAT domain are session based. Special provision can be made to forward connections initiated from the outside. However, externally managing networks through a NAT firewall is impractical, because one would have to configure the NAT to make each network element within the NAT accessible from outside.

Systems that have attempted to manage multiple networks have not satisfactorily dealt with a number of issues, including:

- Overlapping private address spaces among the managed networks. Disparate networks may well utilize the same private address allocation, resulting in conflicts. Existing workarounds have involved assigning different network schemas, which can be prohibitively inconvenient and expensive, particularly in light of the need to change the entire schema at once; attaching to one network at a time, through VPN or static routing, thus creating time gaps in monitoring or providing multiple management infrastructures at great duplication and expense. Another approach, as reflected in U.S. Pat. No. 7,302,469, assigned to Ricoh Company, Ltd., is to use instead a schema presumed to be globally unique, such as one based on MAC addresses. However, such a system, while providing a monitoring capability, does not provide any means for a remote facility, external to the devices' local network, to address the devices individually in order to manage them.
- Need for special arrangements to access and manage processes and resources within each network. No general method has existed for remotely managing network processes and resources without providing some "special" means of access, such as a VPN, a hole in a firewall or the like. All of the prior approaches involve expense, inconvenience or security compromises that are unacceptable to many potential customers for network management services.
- Overwhelming amount of network event information. Each network is capable of generating a very high volume of event information for purposes of monitoring. The volume of this information multiplies when a plurality of networks are aggregated for management. Existing systems have not adequately dealt with the issue of how to limit the event information to what is relevant, without compromising the continuous ability to monitor relevant information.

Accordingly, there is a need for a practical and effective methodology for managing and servicing a plurality of disparate networks from a single, common infrastructure, in a manner supported by prevailing customer firewall and security practices without extensive or inconsistent provisions for special access, and for a converged network management application that takes advantage of those techniques and delivers a management platform as a service that can view and/or manage all managed networks in the aggregate, or any one of them individually.

BRIEF SUMMARY OF THE DISCLOSURE

In one embodiment, a system is provided for monitoring and managing a plurality of disparate networks and systems from a centralized physical location that is separate from the location of any of the managed networks or systems, in which the operations are effected without requiring the owner of any network or systems being managed to change any topological features or elements and without requiring a dedicated connection to any of the managed networks. This system can be provided as service, by which a user can view and/or manage all managed networks in the aggregate, or any one of them individually.

In a further aspect, to facilitate the ability to manage a plurality of disparate networks and systems, there may further be provided the ability to manage network topologies with overlapping IP address schernas for their respective elements, by combining, within each element's local domain, a unique identifier with the address of the element, and making the combined unique identifier available to the other elements in the management system.

In certain embodiments, the above-described capabilities may be provided through deployment of modular software components to the managed networks; routing commands among such components by expressly or implicitly specifying a route, specifying a command, invoking a socket with the route and command as parameters, routing the command and parameters in accordance with the route, executing the command with its parameters at the route target, returning any results of the execution back through the route, and closing down the route when the execution is completed.

These embodiments may also provide a method for the management system to access a plurality of network management processes, for a plurality of network facilities, by making a request to a selected one of the network facilities to subscribe to a network management process on the facility; and, at about the same time that the facility updates its own internal representation of the information, relaying to the management system changed information concerning the network management process subscribed to. This mechanism, referred to herein as "publish and subscribe", is used to support a rich variety of information outputs and displays, for both the aggregate and the individual managed networks, for purposes of management.

Thus, the disclosure provides methods for managing and servicing a plurality of disparate networks from a single, common infrastructure, without requiring any owner of the networks or systems being managed to change any topological features or elements.

It facilitates management and servicing methods for a plurality of disparate networks by providing a method for overcoming address space collisions that might exist between managed networks and systems.

It provides a uniform and comprehensive method and protocol for routing communications among management elements, so as to be able to build management infrastructures extensibly based on a manageable selection of fundamental management elements.

It provides a method, in a system for managing and supporting disparate networks and systems, for remotely viewing real-time information about multiple network management processes, without accepting either an overwhelming amount of irrelevant data or restricting the data view so as to exclude relevant data.

It takes advantage of the technologies to meet the individual objectives above in order to provide a converged network management application that delivers a management platform as a service that can view and/or manage all managed networks in the aggregate, or any one of them individually.

Other aspects and advantages of the developments disclosed herein will be apparent from the accompanying drawings, and the detailed description that follows.

BRIEF DESCRIPTION OF THE SEVERAL VIEWS OF THE DRAWINGS

For a more complete understanding of disclosure and the advantages thereof, reference is now made to the following description taken in conjunction with the accompanying drawings, wherein like reference numerals represent like parts, in which:

FIG. 5 is a depiction of a screen display of an exemplary network management application, directed to the monitoring and management of a selected one of the managed networks.

FIG. 6 is an exemplary depiction of a screen display showing event lists for a selected managed network being monitored in accordance with one embodiment.

DETAILED DESCRIPTION OF THE DISCLOSED EMBODIMENTS

The following is a detailed description of certain embodiments of the disclosed technologies, chosen to provide illustrative examples of how they may preferably be implemented. The claimed inventions are not, however, limited to the specific embodiments described, nor are they limited by any specific implementation, composition, embodiment or characterization depicted in the accompanying drawings or stated or described in the foregoing summary or abstract. In addition, it should be noted that this disclosure describes a number of methods that each comprise a plurality of steps. The order in which process steps are set out in any claim should not be understood to necessitate solely by reason of such ordering that the steps must be performed in the stated order.

Certain terms should be understood in a specific defined manner for purposes of understanding this specification and interpreting the accompanying claims:

"Disparate networks" means networks under different ownership or management, or otherwise characterized by having different architectures, different management policies, and possibly mutually conflicting addressing schemas.

"Socket" means an end point in a bidirectional communication link. A TCP/IP socket is a socket, but other sockets exist (and are used in the context of this disclosure) that are not TCP/IP sockets, or, although instantiated from the same abstract base class as a TCP/IP socket, do not have the full functionality of TCP/IP sockets.

"Special" access to a network means a basis for access to a network requiring special authorization, permissions, or arrangements that must be individually set up by a privileged administrator to access the network from outside, such as special credentials, VPN access, a special opening in a firewall, manual construction of sockets and tunnels, and the like.

"Downstream" RIGs are RIGs ("Remote Intelligence Gateways," as described below) that are reachable directly or indirectly from a first RIG by communications over the protocols disclosed herein through a chain of one or more subordinate RIGs, and "upstream" RIGs means the reverse, RIGs that can reach a given RIG via the protocols disclosed herein through a chain of one or more RIGs subordinate to the upstream RIG.

A CIP ("Central Intelligence Platform," as described below) is a processor that is a superset of a RIG; that is, a CIP is a RIG, and also has added functionality not found in all RIGs.

Exemplary System Architecture

Figure 1:
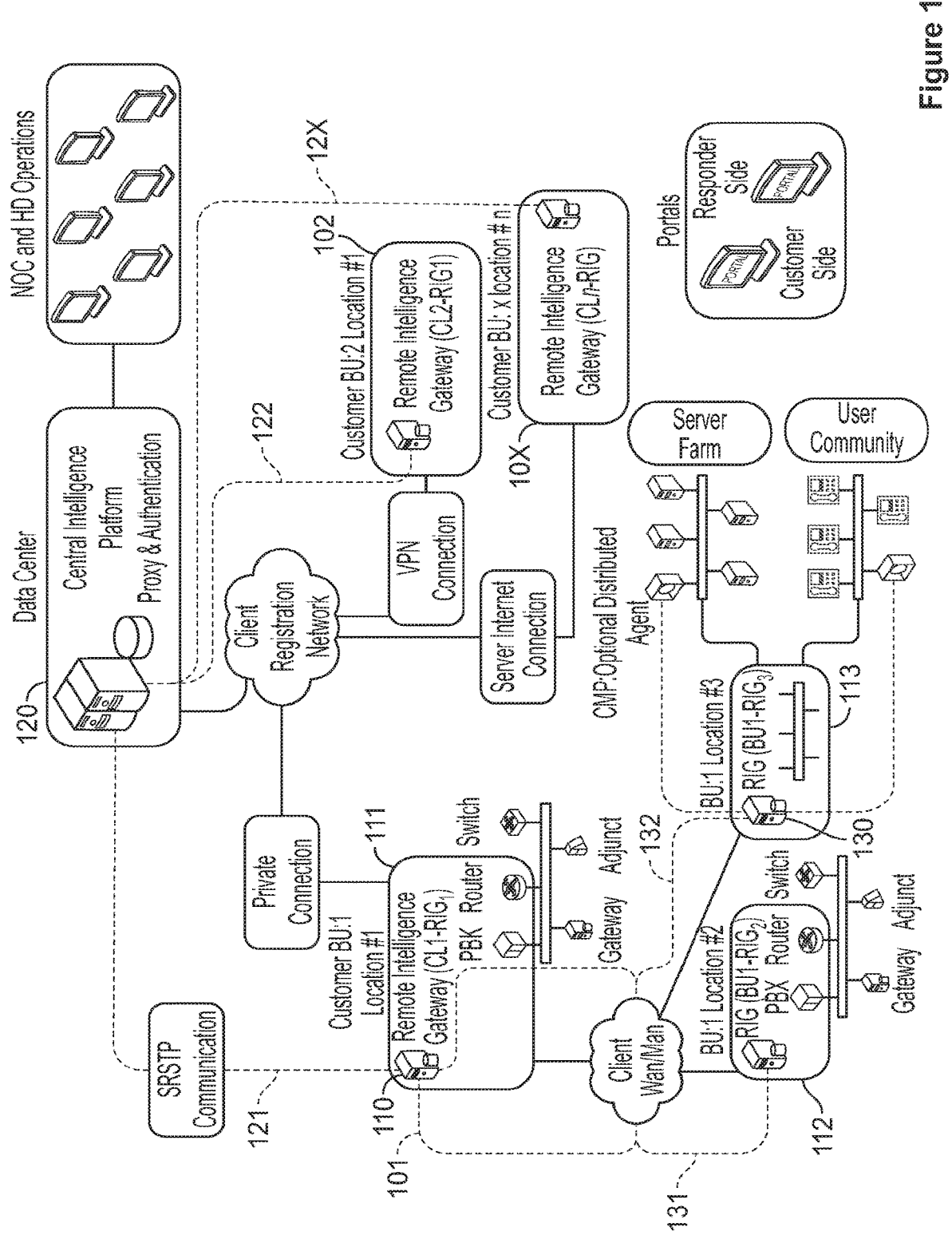
FIG. 1 is a block diagram showing the various components in an exemplary deployment of one of the disclosed embodiments, and the interconnections of those components.

FIG. 1 is a high-level block diagram showing an overview of the various components in an exemplary deployment of one embodiment of the disclosure, and the interconnections of those components. This figure shows networks 101, 102, etc., through 10x, belonging to Customer Business Units 1, 2, etc., up to Customer Business Unit x. The Customer Business Units may be completely unrelated business organizations, which have in common only the fact that they use the same service provider to manage their respective networks. Network 101 of Customer Business Unit 1 is shown in greater detail than the others, although it should be understood that the others may have networks of comparable, greater or lesser complexity, which is not shown in FIG. 1. In the example shown in FIG. 1. Customer Business Unit 1 is shown as having three locations, 111 (the main location), 112 and_113. Within the network infrastructure at each location (111, etc.) is a Remote Intelligence Gateway (RIG), shown as CL1-RIG1 in location 111, and CL2-RIG1, etc. at other locations. Each RIG runs on a processor having non-transitory machine-readable storage media as shown for example at 110. In the embodiment shown, RIG CL1-RIG1 is at Location 111, RIG BU1-RIG2 is at location 112, and RIG BU1-RIG3 is at location 113. A Central Intelligence Platform (CIP) is provided within Data Center 120. Data Center 120, in this embodiment, is a single facility maintaining connections 121, 122 and 12x over the SRSTP (Secure Remote Session Transport Protocol, as will be described in further detail below) with each of Customer Business Units 1-x, and more particularly (as shown by the continuation on the customer side of the dashed lines for 121, 122 and 12x) with the RIG at what is regarded for network management purposes as the principal facility of the Customer Business Unit. Each of those RIGs is similarly connected via SRSTP to the RIG at the immediate downstream Customer Location, as shown by dashed lines 131, 132. CIP 120 operates based on a software construct that extends the class on which RIGs are based, and thus, in addition to considerable added functionality, CIP 120 contains all of the functionality and attributes of a RIG.

Overcoming Address Space Collisions Between Disparate Systems

Overcoming Address Space Collisions Between Disparate Systems

Enterprise networks may use global or private IP addressing. Because of the shortage of globally unique IP addresses, many enterprises opt for one of the private address spaces defined by RFC 1918 or in accordance with other widely accepted conventions. These provide ranges of addresses privately useable within an organization, yet not routed through the public network, and therefore need not necessarily be globally unique. Thus, it entirely possible that two or more of Customer Business Units 101-10x may have adopted private address schemas that overlap, and if connected directly together, would conflict. For example, Customer Business Unit 1 (network 101) and Customer Business Unit 2 (network 102) may each have independently adopted a 172.16.0.0/12 private addressing schema. A device may exist within each network having the identical address, for example, 172.16.7.33. In order to be able to centrally manage both systems, a means is necessary to differentiate two nodes in disparate networks under management that have been natively assigned the same address.

The most widely used method for communicating with a privately-addressed node from outside its own addressing domain is "Network Address Translation" (NAT). However, NAT is a session-based protocol in which sessions are generally initiated from the inside. This is not sufficient for management, where contact must often be initiated from outside the managed network. Another approach is for the NAT router, or a proxy server, to forward communications in accordance with special data entries, but this effectively leaves a "hole" in the enterprises firewall, and thus poses administrative burdens and security risks. Another workaround would be to reassign all affected networks to a large address space, such as 5.0.0.0/8, However, such a change requires that everything on the network be migrated to the new address schema all at once, which can be prohibitively resource-intensive and expensive.

One embodiment of the present disclosure solves this problem by the following technique:
- Deploying a system (e.g., a RIG) local to the topology being managed
- Abstracting and tagging, on the RIG, the names and attributes in the infrastructure local to the RIG
- Naming the RIG with a unique ID (e.g., CL1-RIG1), plus a timestamp (e.g., 2008-0601-21:33: 17.04)
- Combining the name with the private address of each infrastructure element to form a new "address" for purposes of common management of the networks
- Publishing the management addresses in an element list on the RIG in a manner accessible to the upstream registrar In this way, an upstream parent (either another RIG or the CIP) can query any downstream RIG (based on authentication and applicable policies), for directory information. The upstream parent can then use those addresses to direct commands to elements internal to the RIG's local network. All such commands will go through the local RIG, which to that extent acts as a proxy. The same addressing scheme will also enable the upstream parent to communicate with additional RIGs downstream of the first RIG. For example, CIP 120 can send a command destined for a device in the local network infrastructure of RIG 130. CIP 120 "knows" the address of the destination device because the directory of RIG 130 is published to RIG 110 and in turn published to CIP 120, and can thus address a command to a device local to RIG 130 by sending that command through RIG 110 (however, how that command is routed is a function of the SRSTP protocol (discussed below), and not of the addressing per se).

Routing Method and Protocol

Another issue presented by the architecture of FIG. 1 is routing, as already suggested by the above discussion of addressing. The issue is how to route commands, and the results of executing commands, in a system in which there have been deployed a plurality of software modules, e.g., modules for local network management, for the purposes of obtaining the effective ability to manage the entire collection of modules (and associated elements) centrally. This requires a flexible, network-enabled mechanism for routing commands in a modular software system. More generally, in order to fully realize the functionality necessary to manage a network as depicted in FIG. 1, a method is needed for intermodule communication and management that is capable of navigating arbitrarily complex topologies without comparably complex pre-arrangements for communications and management.

For example, it can be seen with reference to FIG. 1 that in order to manage networks 101, 102, etc. it is necessary to be able to route various management commands to all areas of the network, and the network may be "layered" through a depth of RIGs. This is shown in most simple form in FIG. 1 as the chain of RIGs 110 and 130, but of course this structure could be extended to arbitrary depth, and the entire infrastructure would have to be subject to management.

Most typically, commands are executed in a network environment with protocols such as RPC, RMI, Corba, JMS (Java messaging service), SOAP, XML-RPC (and other similar protocols). However, these are point-to-point protocols and have no routing other than the routing otherwise provided in the environment in which the command is invoked. In the present case, such routing does not necessarily exist. For the reasons discussed in general above, it is not desirable to have to establish such general routing, where it is not otherwise required, simply to enable management functions. In addition, when managing centrally, there is a need to maintain a separation of different customer networks, for security purposes.

Commands could be routed in a complex system by chaining a series of interactive protocols, such as telnet or SSH, and "hopping" to the destination device. Similarly, one could manually construct the requisite sockets and tunnels. However, making provisions for such communications has the administrative and security drawbacks previously discussed.

A type of distribution similar in some ways to what is contemplated here was historically done for mail routing, with the Unix-to-Unix Copy (UUCP) mail delivery protocol. A mail message destined for a user on machine box3 which was not local but connected through machine box2 would be addressed to box2!box3!user (referred to as "bang" protocol). However, the UUCP protocol was unidirectional. If used to address a command, it could not return the result of executing the command, and thus would be lacking for network management.

Figure 2:
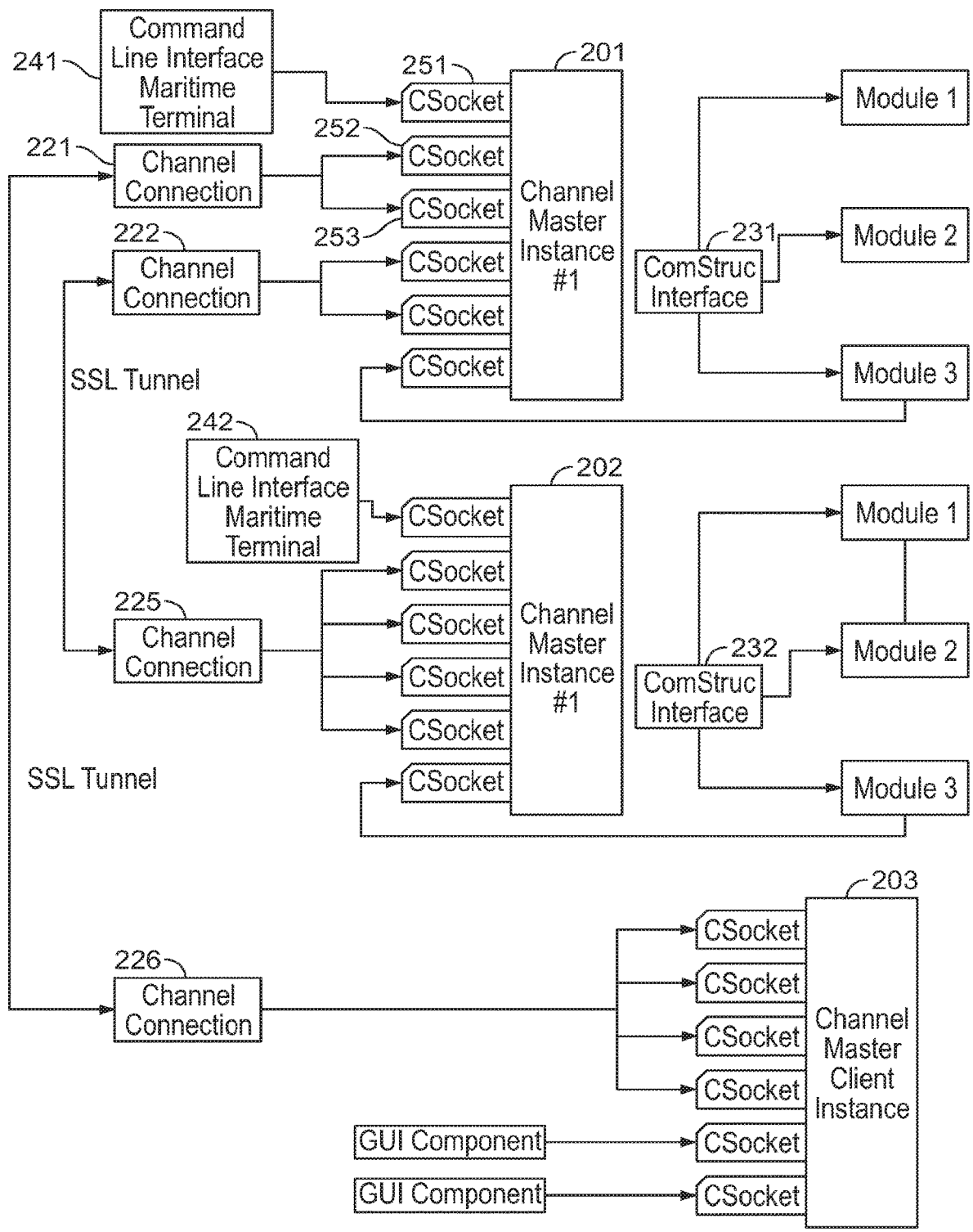
FIG. 2 is a block diagram showing socket and channel connections for the routing method and protocol used in one embodiment.

FIG. 2 is a block diagram showing socket and channel connections for the routing method and protocol used in one embodiment of the disclosure. Channel Master Instances 201, 202 and 203 represent RIGs. Channel Master Instance 203 is a specialized RIG that primarily functions to provide a control console and GUI interface. Channel Master Instance 201 may be an ordinary RIG or a CIP (with additional functional elements not shown). In addition, Channel Master Instances may be chained to greater depths than shown in FIG. 2, by adding Channel Master Instances and connecting them to additional Channel Connections on an upstream Channel Master Instance, e.g., an additional Channel Connection (not shown) similar to Channel Connections 221, 222.

Modules 1, 2 and 3 shown on each of Channel Master Instances 201 and 202 represent devices local to their respective Channel Master Instances. ComStruc Interfaces 231, 232 are the respective interfaces between the Channel Master Instances 201, 202 and the associated Modules.

Each Channel Master Instance has one or more Channel Connections, e.g., Channel Connections 221, 222, 225 and 226 to other Channel Master Instances. Preferably, the actual connections between these elements is by way of an SSL tunnel, though encryption is not strictly necessary. Each Channel Master Instance other than one having full GUI facility will usually have an associated Command Line Interface, e.g., 241, 242, referred to in FIG. 2 for historical reasons only as a "Maritime Terminal".

Each Channel Master Instance also has communications interfaces called CSockets (251, 252, etc.), through which it communicates with external devices and interfaces. Some of the CSockets, e.g., 252, 253, are connected in sets of a plurality of CSockets to the corresponding channel connection, reflecting the fact that a number of different management processes can be routed through the same channel connection.

The routing system underlying FIG. 2 is command based. Ultimately, each message routed delivers a command to be executed on the receiving end of the routing chain. These commands are forwarded through CSockets. The result is a hybridization of a command with a bi-directional socket.

The commands employed in the exemplary system comprise a large number of total commands, and are arranged in a tree structure, similar in some respects to the Microsoft® NT™ NET command, but with more options. They are called "ComStruc" commands. A list of a number of exemplary ComStruc commands, which illustrate the functionality and syntax of this command hierarchy, is set forth in the Appendix attached hereto.

As seen in Table 1 of the Appendix, in the preferred embodiment, the ComStruc commands form a tree structure, with the "leaves" of the tree being actual commands, and the "branches" being containers (or categories) for commands. The command is fully specified by concatenating the strings from the root to the desired leaf, and adding any necessary parameters. An example of such a command (absent the routing path element) is "tools restart". In this example, "tools" is a container, and "restart" is a target (and a ComStruc command). An address would be given as a parameter. The effect of the command would be to restart the service at the address specified. As can be seen, many other commands are provided. Examples of parameters are: IP addresses, names of devices, user names, port designations, etc.

The objective is to pass commands down recursively to the desired target module. The routing is specified together with the desired command, in the SRSTP protocol. The routing path is a "bang" ("!")-delimited series of server (RIG) names.

The SRSTP protocol has the following general structure (the format of the following description will be readily appreciated by those familiar with BNF and/or "man pages"):

SRSTP Packet: [!SERVER1NAME] [!SERVER2NAME . . . ]ComStruc Command [PARAMS]
ComStruc Command: container+ComStruc Command II target
PARAMS: string*string: nonspacestring II nonspacestring+

CSocket extends the Java Socket class, but this is done for purposes of compatibility rather than communications functionality. CSocket is based on the simplest, non-implementation invoking variant of Socket. Communications functionality similar to that of a Socket is provided, but independently and not by inheritance.

A CSocket's constructor accepts a ComStruc command as a parameter. If the command has no routing explicitly specified, it is passed to local Channel Master Instance, which passes it to the to the local ComStruc tree to find the target and execute it if possible (locally). If routing is specified, the command is still passed to the Channel Master Instance (e.g., 201), but is then passed to the Channel Connection (e.g., 222) whose name matches the first routing command. It strips off its own name (the first name in the routing string received) and passes it across an SSL connection to a peered Channel Connection (e.g., 225). That Channel Connection then passes the command to its local Channel Master Instance (in this example, 202). The same process is then repeated on this Channel Master instance, forwarding the packet again if necessary, otherwise executing it locally. Since each Channel Master Instance has the same core functionality, this process may be continued indefinitely in a recursive manner, to traverse the entirety of the network, to the extent that Channel Master Instances have been deployed.

Results of command execution are passed back in the same manner as for an ordinary Socket (but not using the implementation of Socket, using CSocket's own implementation instead). A completion message is also sent from the target to close down the CSocket connections.

In more general terms, the preferred embodiment described above provides a method for routing commands in a modularized software system, comprising:

Expressly or implicitly specifying a route
Specifying a command
Invoking a socket with the route and command as parameters
Routing the command and parameters in accordance with the route
Executing the command with its parameters at the route target
Returning any results of the execution back through the route
Closing down the route when the execution is completed The commands in the foregoing method may also be provided in a hierarchy of containers and commands. The links of the route are tunneled, preferably over SSL.

It can also be seen, in light of the foregoing discussion, that a system for implementing the SRSTP protocol as described above generally provides An application that implicitly or explicitly specifies route and command and invokes the socket with the route and command as parameters One or more local facilities, each comprising A channel master that sets up routing by matching specified routing with open channel connections A channel connection that communicates the rest of the route and command to another channel connection, and A target within the last one of the instances that executes the command In addition, it should be noted before moving on to the next topic of discussion that one of the ComStruc commands provided in the preferred embodiment, as set out in Table 1 of the Appendix, is the local Connect command. Using local Connect on each end of a CSocket chain established over SRSTP allows virtually any service or network operation (e.g., maintenance) to be tunneled through the SSL connections set up between the sockets, without the need for a VPN. For example, this mechanism can easily be used to establish a telnet or SSH interactive session between a CIP console and a resource deep within a managed network, or a Remote Desktop Protocol (RDP) session to remotely control a computer in that network (including without limitation conducing any local network management operations through that computer), and so forth.

In addition, in a similar manner, the entire communications structure reflected in FIG. 2 could be deployed in tandem with an operational support system (OSS) to serve as a proxy server providing a means for the OSS to access the serviced networks.

It should be apparent from the foregoing that SRSTP provides a flexible foundation for a network management application, particularly for remotely and centrally managing and supporting disparate networks.

In addition, the distributed information gathering provided by certain embodiments allows network managers to understand the operational state of managed elements, which may be geographically distributed across a given network, from the local perspective of the observed element. Furthermore, such distributed information gathering avoids introducing measurement artifacts, such as artificial latency.

"Publish and Subscribe" Mechanism

We turn now to methods by which a management system for a plurality of disparate networks can remotely view real time information about multiple network management processes. This capability is important for a range of applications, and most fundamentally, in order to be able to effectively monitor events in the networks being serviced.

Prior solutions to this problem, to the extent even attempted, were to continuously refresh a global display or database of all network events, or to limit the event data acquisition to refresh one source at a time. Neither approach is fully satisfactory. The former approach is not selective and is not scalable. The latter approach inherently concedes any ability for real time monitoring.

One disclosed embodiment uses what might be called a "publish and subscribe" (or alternatively, a "subscribe and push") mechanism for remotely monitoring events in a plurality of disparate networks.

Figure 3:
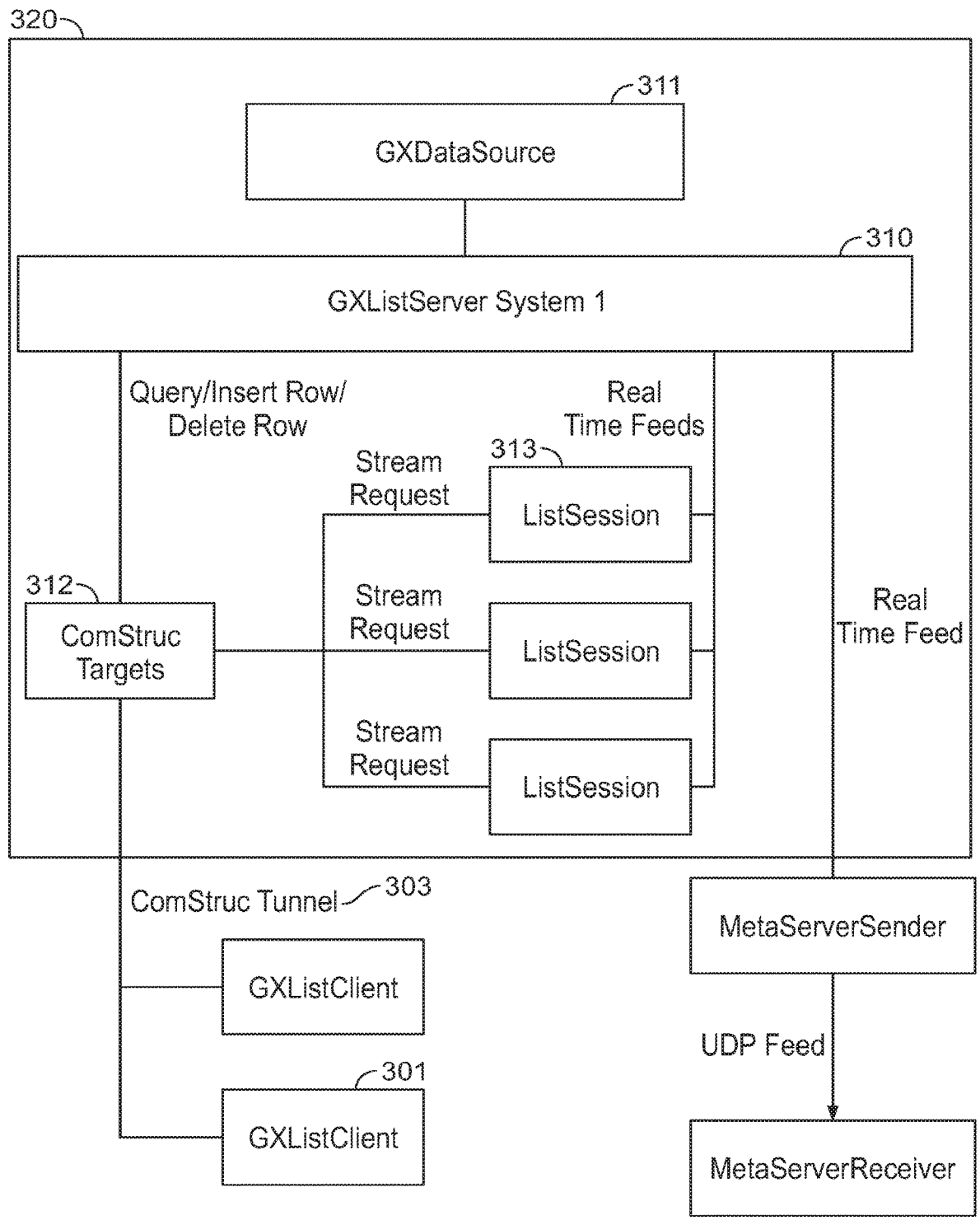
FIG. 3 is a block diagram showing an exemplary set of server components and client applications that use one embodiment of a publish and subscribe mechanism in accordance with the disclosure to display data on the clients.

FIG. 3 is a block diagram showing an exemplary set of server components and client applications that implement a publish and subscribe mechanism to acquire event data from remote networks in real time, and to display the data in a management application. GXListClient 301 is a client application, for example a management console application on CIP 120 (as in FIG. 1), or an upstream RIG. GXListServer System 310, GXDataSource 311, ComStrucTargets 312 and ListSessions 313, etc. all reside on managed network 320. GXListClient 301 communicates with the managed network 320 over ComStruc Tunnel 303, in the manner discussed above in connection with FIG. 2. The routing is the same as discussed in connection with FIG. 2, but for simplicity FIG. 3 shows the ComStruc Tunnel terminating in ComStruc Targets 312, which is the command tree discussed in connection with FIG. 2 (and shown in FIG. 2 as ComStruc Interface 232). A table is maintained in GXDataSource 311 to hold status information on each monitored process on managed network 320. A GXListServer System, e.g., 313, exists for each such table.

To initiate the publish and subscribe procedure, a GXListClient, e.g., 301, sends a ComStruc DATA GXSTREAM CONNECT message over ComStruc Tunnel 303 to ComStruc Targets 312. That command goes to GXListServer System 310. GXListServer System 310 instantiates a List Session, e.g., ListSession 313.

(Phase 1) On instantiation, ListSession 313 goes into a loop, listening for a request to change tracks (track change)—a request for certain columns using a certain filter. The requester, in this case, GXListClient 301, then sends a track change request (GXQUERY). GXListClient uses a CSocket (as in FIG. 2) to make the track change request.

ListSession 313 receives the GXQUERY query command and goes into "dumping mode"—whereby it collects all responsive information for the element subscribed to and sends it back to the requester (301) through ComStruc tunnel 303, and also reports its progress to the requester. ListSession 313 also maintains a record of the current query. At this point, a "subscription" for specified updates on a specified network process has been established.

(Phase 2) GXListServer 310 is responsible for maintaining the relevant table. Database updates, destined for GXDataSource 311, go through GXListServer 310. Each database update request also goes to each and every ListSession object, 313, etc. Within ListSession object 313, etc., the update request is matched against a filter and requested column names. If there is a match (i.e., if the database server is updating data that has been subscribed to) the update information (which can be add, remove or change) is sent to the GXListClient (e.g., 301), at about the same time as the actual database update is made. In other words, after information has been subscribed to, the "middleware" process that updates the local table (i.e., GXListServer 310) also copies the new data to a socket (i.e., the CSocket established by the ComStruc message), directed to the subscriber. To avoid any overflow, the update transmission goes through a queue. In this manner, the requested information is "published" (or "pushed") to the requester.

At any time while the socket is open, the GXListClient 301 can request a new filter and new columns, in which case there will be a new dump and then updates (phase 2).

FIGS. 4-13 show selected screen displays of an exemplary "management console" application that may be run from CIP 120, taking advantage of the "publish and subscribe" mechanism described above, as well as the addressing and routing techniques discussed herein. In the examples shown, the network in question handles voice-over-IP (VOIP) telephony, as well as data communications.

Figure 4:
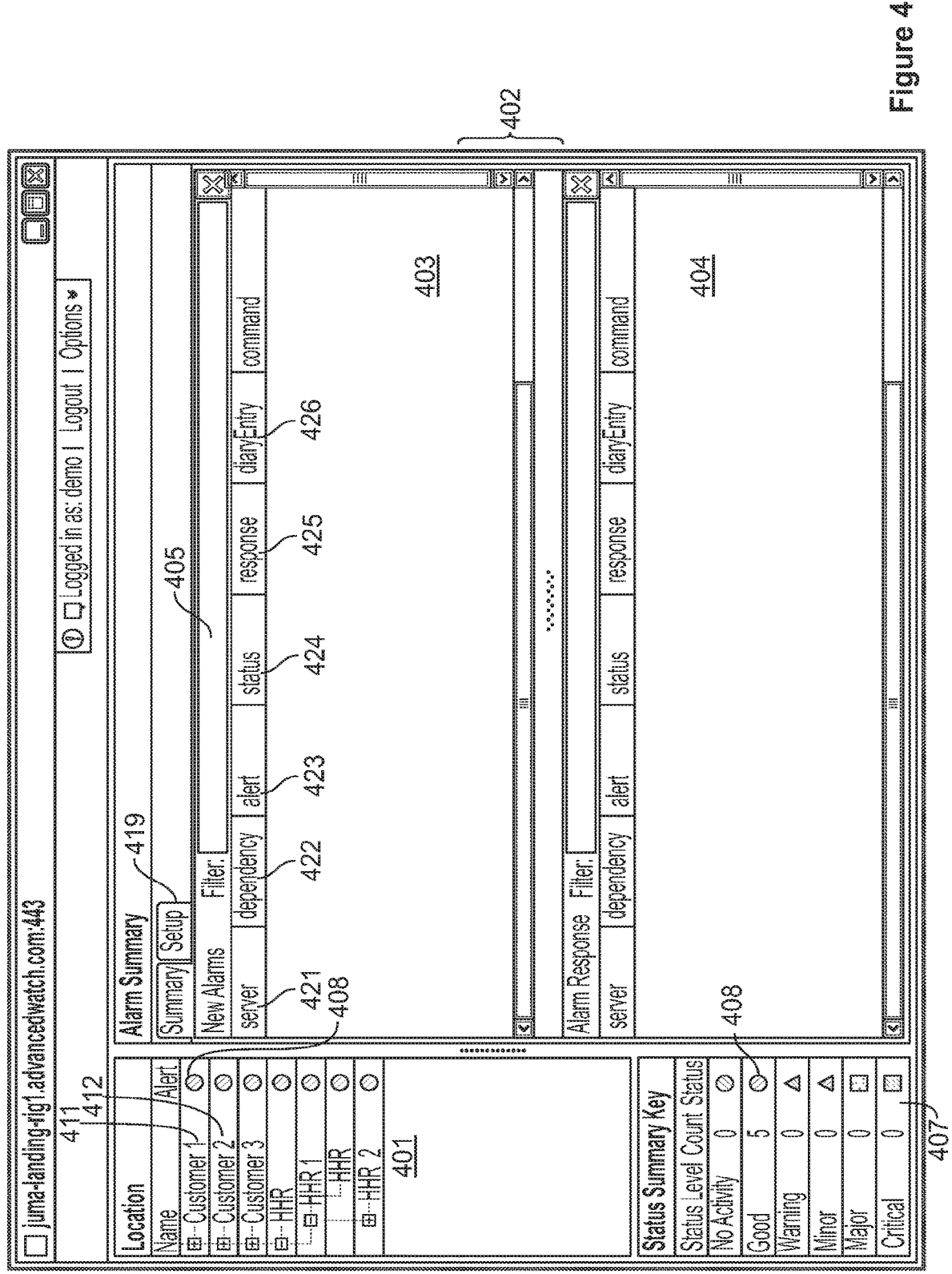
FIG. 4 is a depiction of a top-level screen display of an exemplary network management application, showing a plurality of disparate networks under management.

FIG. 4 shows a typical GUI screen 400 of the management console. The upper left-hand panel 401 of the screen shows a list, 411, 412, etc. of disparate networks under management, belonging to different companies. Below that, in area 407, is a status summary showing the number of servers at each of a plurality of status levels, and the associated icon. As can be seen, in this example all five servers being observed are in a "good" status, with the corresponding "green light" icon 408 shown next to the corresponding entries 411, 412, etc. in upper left-hand panel 401. The right-hand panel 402 (divided into upper and lower sections, 403 and 404) shows a summary of "alarms" that require an operator response for all customers. The displayed alarms can also be filtered through filter box 405. For each alarm there is shown a set of data in tabular form, including the server on which the alarm occurred (421), the top node of the chain of resources ("dependency tree") that depend on the server (422), the alert level (e.g., 0-5) (423), the status (e.g., New, Responded to, Closed) (424), a response field (425) indicating who responded to the alarm, a diaryEntry field (426), which is a link to a table with a more detailed description, and other information. The top-right panel (403) summarizes all current alarms that have not been responded to; the bottom-right panel (404) shows alarms responded to. When an alarm has been resolved, its display disappears from this display. By clicking a mouse on one of the network entries 411, 412, etc. in upper left-hand panel 401 a user of the management console can select one of the managed networks.

Figure 5:
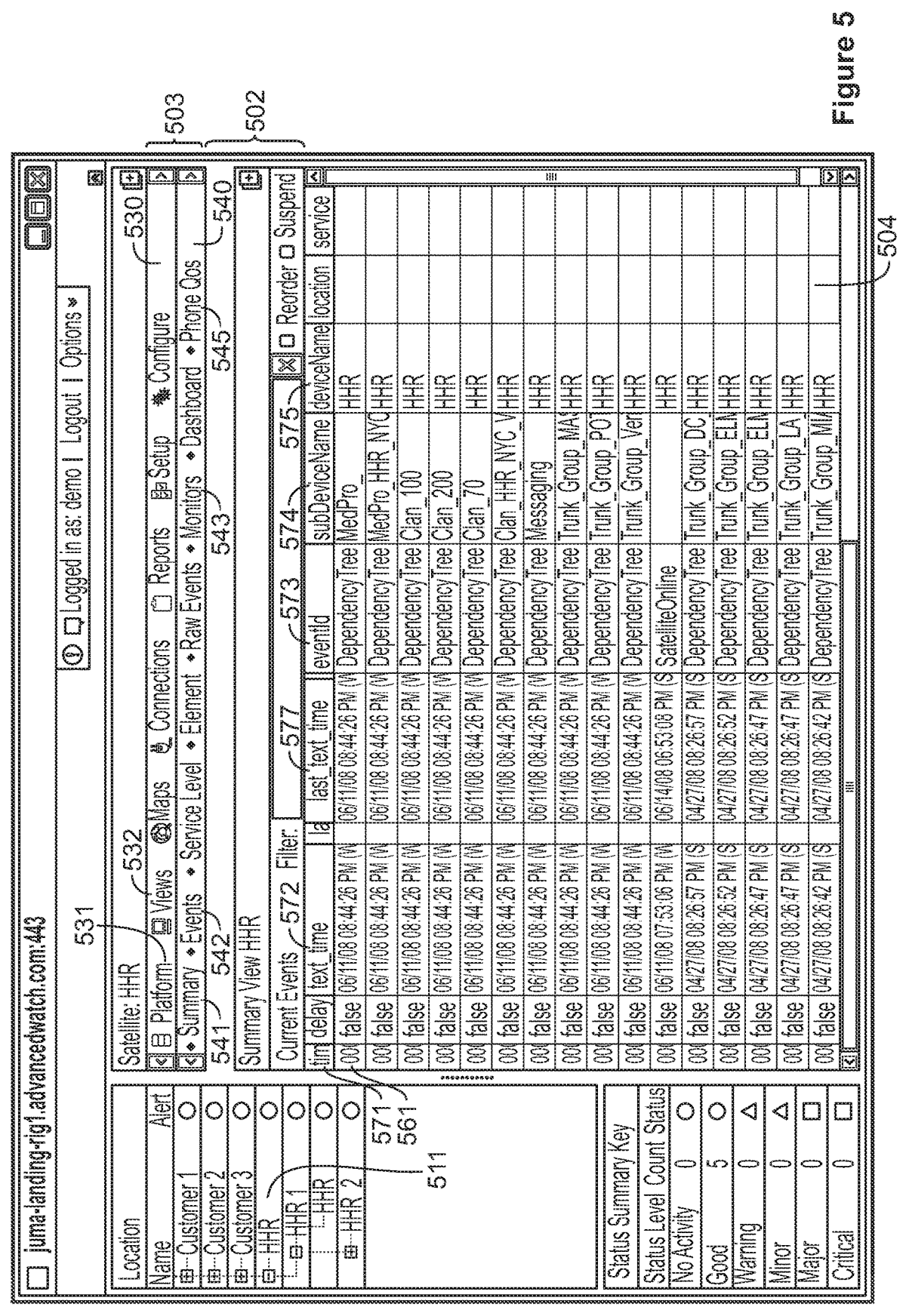

FIG. 5 shows a screen that is displayed after the user of the management console has selected one of the networks as discussed above in connection with FIG. 4. From this screen, the user may view the status of the network using a variety of tools or use the RIGs' ability to temporarily bridge the client computer with the remote network to use desktop sharing applications or run management applications. By default, this view, in the embodiment shown, displays an event summary for the selected network, in this case, HHR (511). The content of this display is provided through "publish and subscribe" mechanism discussed above. The content is dynamic, and continually refreshes in real time. A plurality of other displays can be swapped in and out of panel 502 by clicking on the icons 531 etc. in main menu 530 on the upper right panel 503. The event summary display shown can also be reached by clicking the Views button 532 and then clicking on "Summary" (541). The listed event lines 561 etc. are each color-coded, corresponding the "Max Alert" level on the device in question. Max Alert means the highest alert level in the device's dependency chain. For each event, there is a time display 571, a "text_time" display 572, which is specified local to the device being reported, the eventId 573, which specifies the event type, the local device name, referred to in this view as subDeviceName 574, the network, referred to in this view as deviceName 575 (because the network is a "device" to the upstream RIG or CPI), and other information. In this embodiment, events are "merged" if possible. This means that events considered "mergeable", such as successive good pings, just have their times updated and prior event time shown, rather than cluttering the display with new events. In such cases, there is an entry in last_text_time 577 for the time of the preceding merged event. The row of items in panel 503 beginning with Summary 541 are links to other displays, including a number of the displays discussed below.

FIG. 6 shows a management console screen for monitoring events on one of a plurality of disparate networks being simultaneously monitored. When a particular customer network is selected, right-hand panel 504 in FIG. 5 displays a top control bar 503 and a lower screen in space 504, which contains the component view selected by the user from the control bar. The user selects (for instance) "Views" 532 from the main menu 530, then "Events" 542 from the submenu 540, and the Event Viewer component would replace the "summary view" component in the component view section, panel 504. The management system has subscribed to events on a number of the managed networks, but FIG. 6 as shown reflects a display limited to one particular customer network ("HHR" 511). The event lists shown in FIG. 6 are dynamic, and update automatically in real time, in accordance with the methods illustrated in FIG. 2. The "Filter" element 605 is an all-column filter to enable a quick filter based on a key that can appear in any column. The upper display panel 603 contains a list of events not acknowledged yet, and for each, a time 661, eventId 673, local device name (deviceName) 674, the service, if any affected 678, the relevant agent IP address (agentIp), if any 679, and other information. The bottom pane 604 shows a list of all events in a time range adjustable by drop-down control 691, shown here as six hours. Columns in panels 603 and 604 (and in similar other displays) can be moved left and right by GUI controls. The left-most column acts as a sort key for the list. By default, the sort key is the time column.

Figure 7:
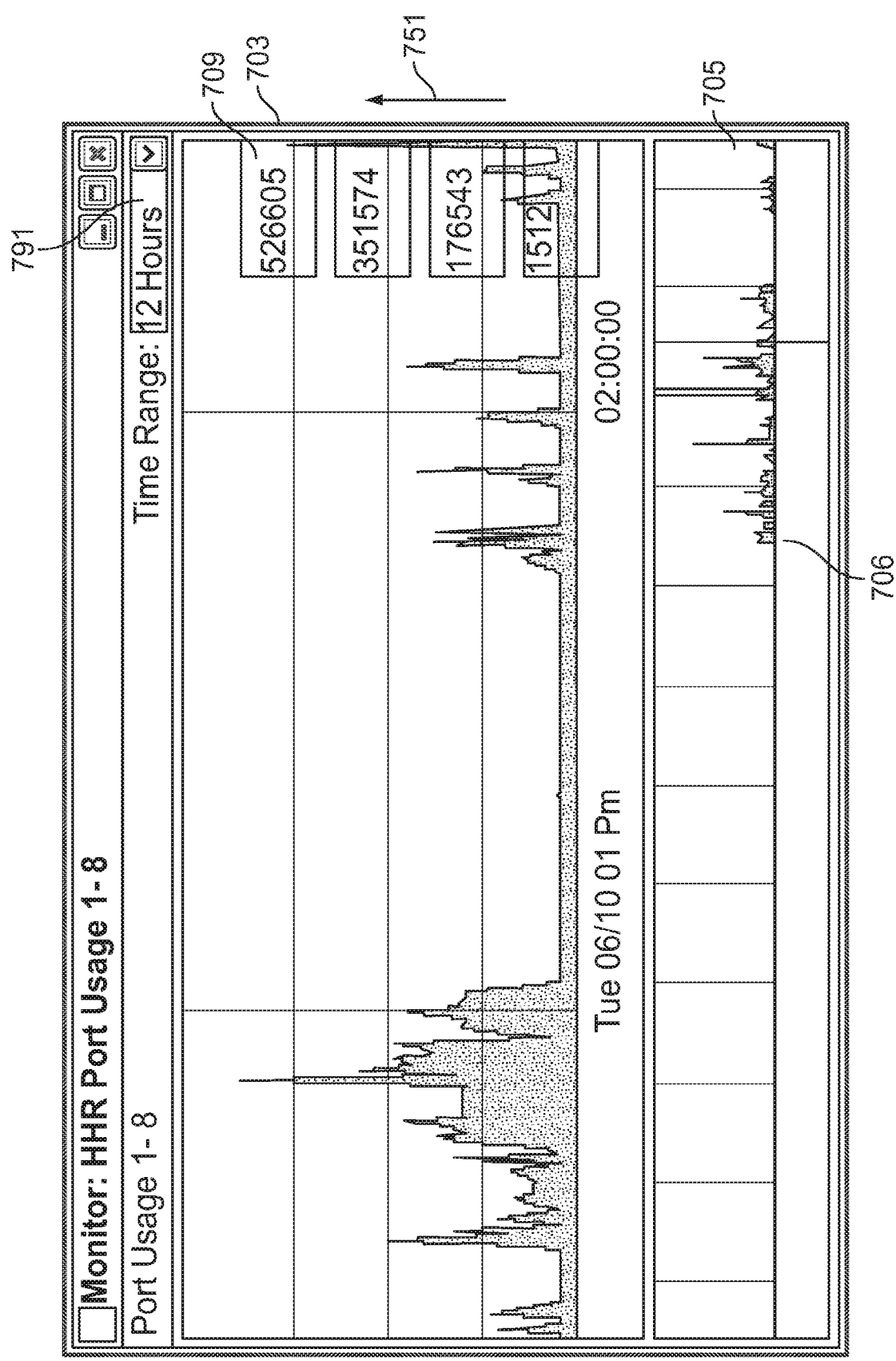
FIG. 7 is an exemplary depiction of a screen display showing the monitoring of port usage on a selected network over time, in accordance with one embodiment.

FIG. 7 shows a "system monitor" type graphic display, showing a display of the volume of port usage on the managed system as a function of time. This screen is also reachable from the Monitors link 543 shown in FIG. 5. The displays appear as moving graphs that scroll from right to left, updating from the right in real time, again in accordance with the methods illustrated in FIG. 2. This particular display shows the usage of port 8 in slot 1 of a device over a selected time range (per drop-down control 791) of 12 hours. The Y-axis 751 is in bits per second. Lower panels 705 and 706 show where the current view (703, 705) fits into a longer time-line 706. The view time frame may also be adjusted by click-and-drag action on panels 705 and 706. The reported bits-per-second numbers 709, etc., displayed in semitransparent windows in this illustration, may alternately be displayed to the right of where the dynamic display traces begin, so as not to overlap the traces.

Figure 8:
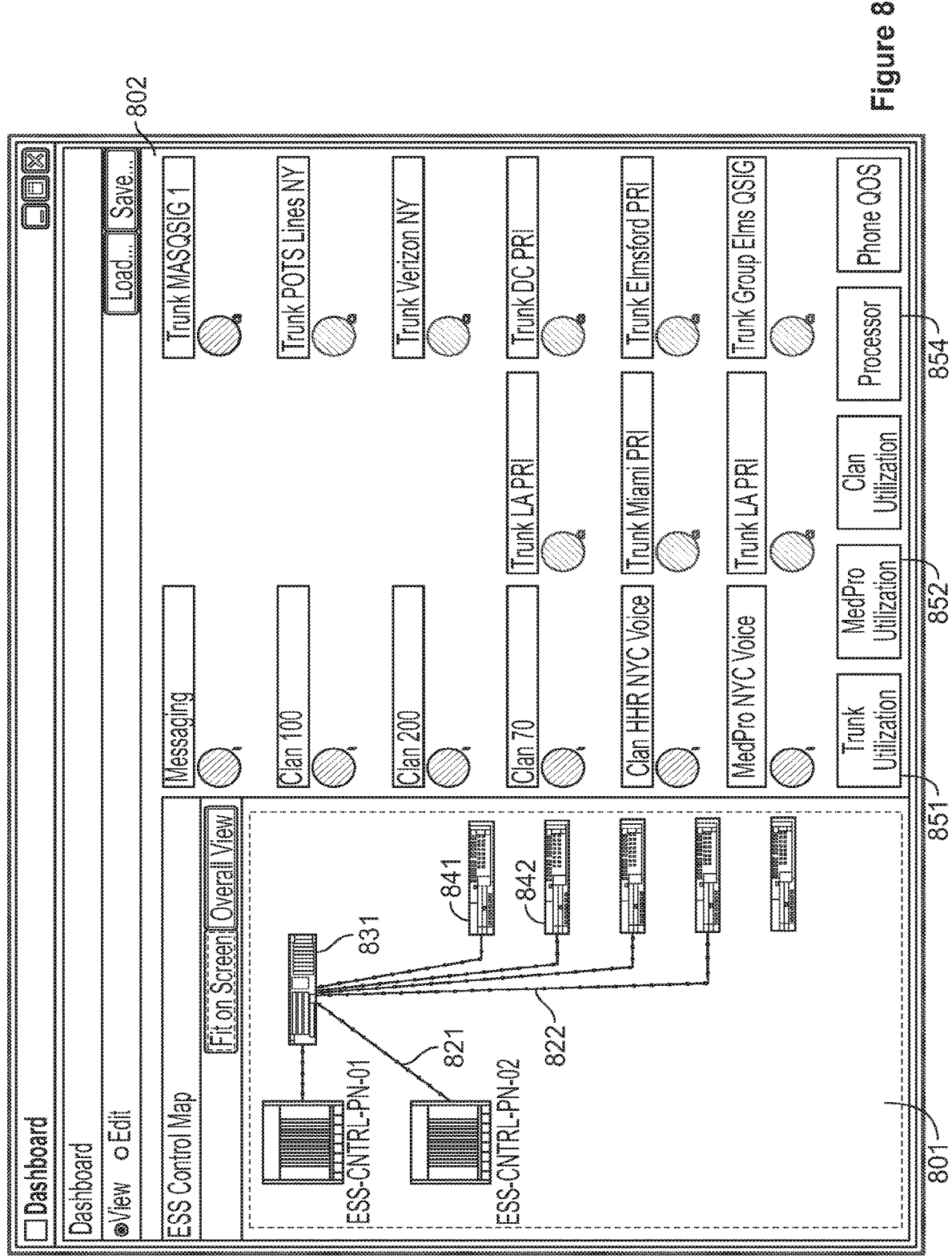
FIG. 8 is an exemplary depiction of a screen display showing a "dashboard" view of a managed network, comprising a network map and a display of elements.

FIG. 8 is an exemplary depiction of a screen display showing a "dashboard" view of a managed network, comprising a network map and a display of elements. Left panel 801 shows a network map, with lines 821, 822, etc. reflecting lines of communication and control. In this case, a CM 831 is shown, connected to Local Survivable Processors (LSPs) 841, 842, etc. LSPs 841, 842, etc. are programmed to assume control of themselves if CM 831 is disabled or loses connectivity. In such an event, the upstream RIG (not shown), which is normally connected to CM 831, will attach directly to the LSPs 841,842, etc. and the former lines of control 822, etc. from CM 831 will disappear. The right-hand panel 802 of FIG. 8 shows the top-level network elements (each of which is a dependency tree), with icons for their status. Links 851, 852, etc. along the bottom of right-hand display panel 802 are links to other "dashboard" displays for panel 802, or which may be displayed in their own windows, which each provide a panel of concentrated, high-level, real-time information about the monitored network(s).

Figure 9:
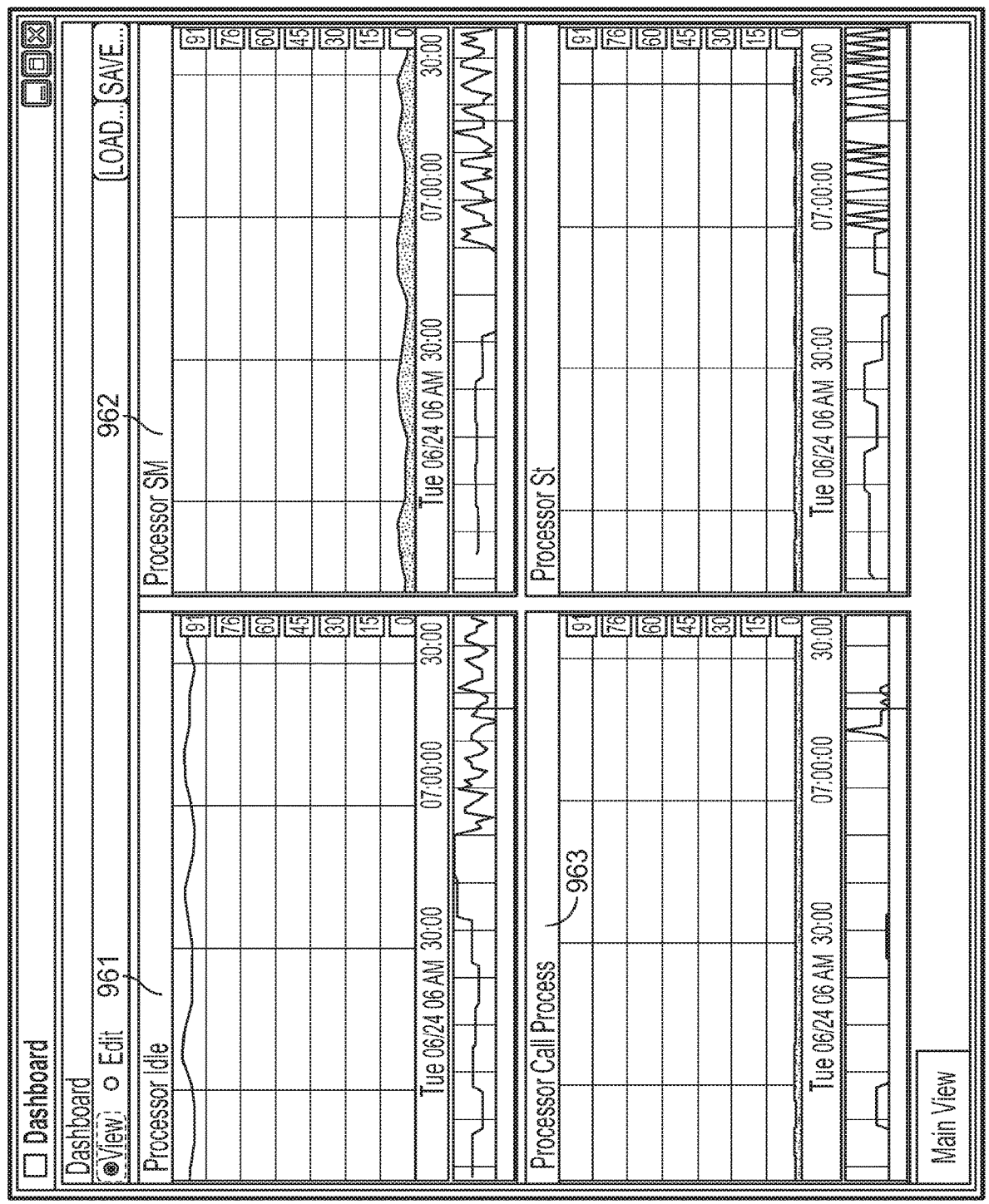
FIG. 9 is an exemplary depiction of a screen display showing health metrics for a central Communication Manager (CM) processor.

FIG. 9 is an exemplary depiction of a screen display showing health metrics for a central Communication Manager (CM) processor. It can be selected from Processor link 854 in FIG. 8. It shows percent processor idle (961), percent processor service maintenance (962), percent processor usage for phone calls (963), and other information.

Figure 10:
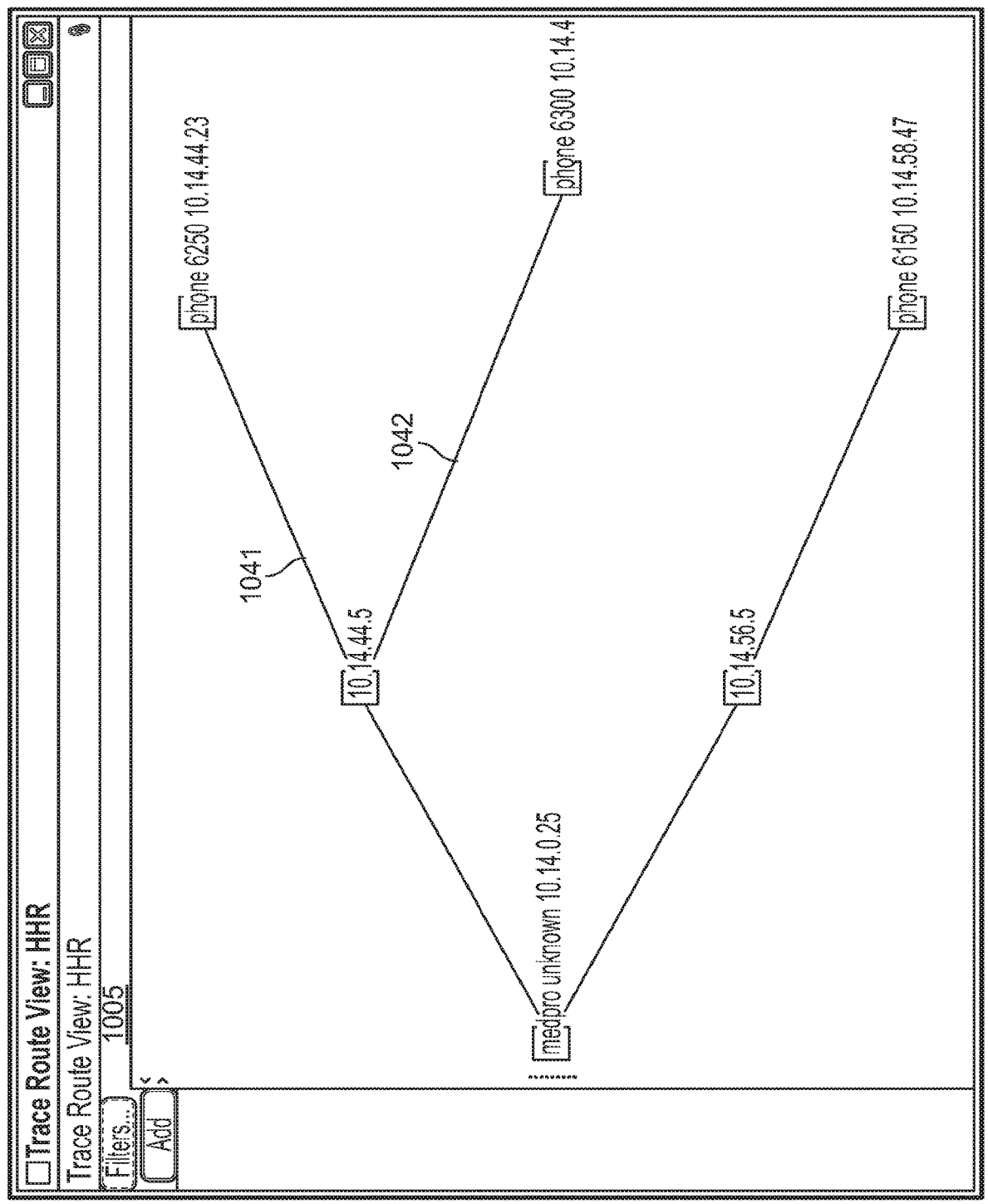
FIG. 10 is an exemplary depiction of a screen display showing phone traceroutes with QOS display.

FIG. 10 is an exemplary depiction of a screen display showing phone traceroutes with QOS display. This screen can be reached by clicking Phone QOS 545 in FIG. 5 and then "Traces" on an intermediate screen (not shown) listing the phones. Double-clicking on an entry in that phone list will bring up the display shown in FIG. 11 below. FIG. 10 shows graphical traceroute depictions for all phones. The phones can be filtered through filter control 1005. The lines of each traceroute 1041, 1042, etc. will change color in accordance with the current quality of service (QOS), which is a function (calculated in accordance with methods well known in the art) of packet loss, round-trip delay and interarrivaljitter.

Figure 11:
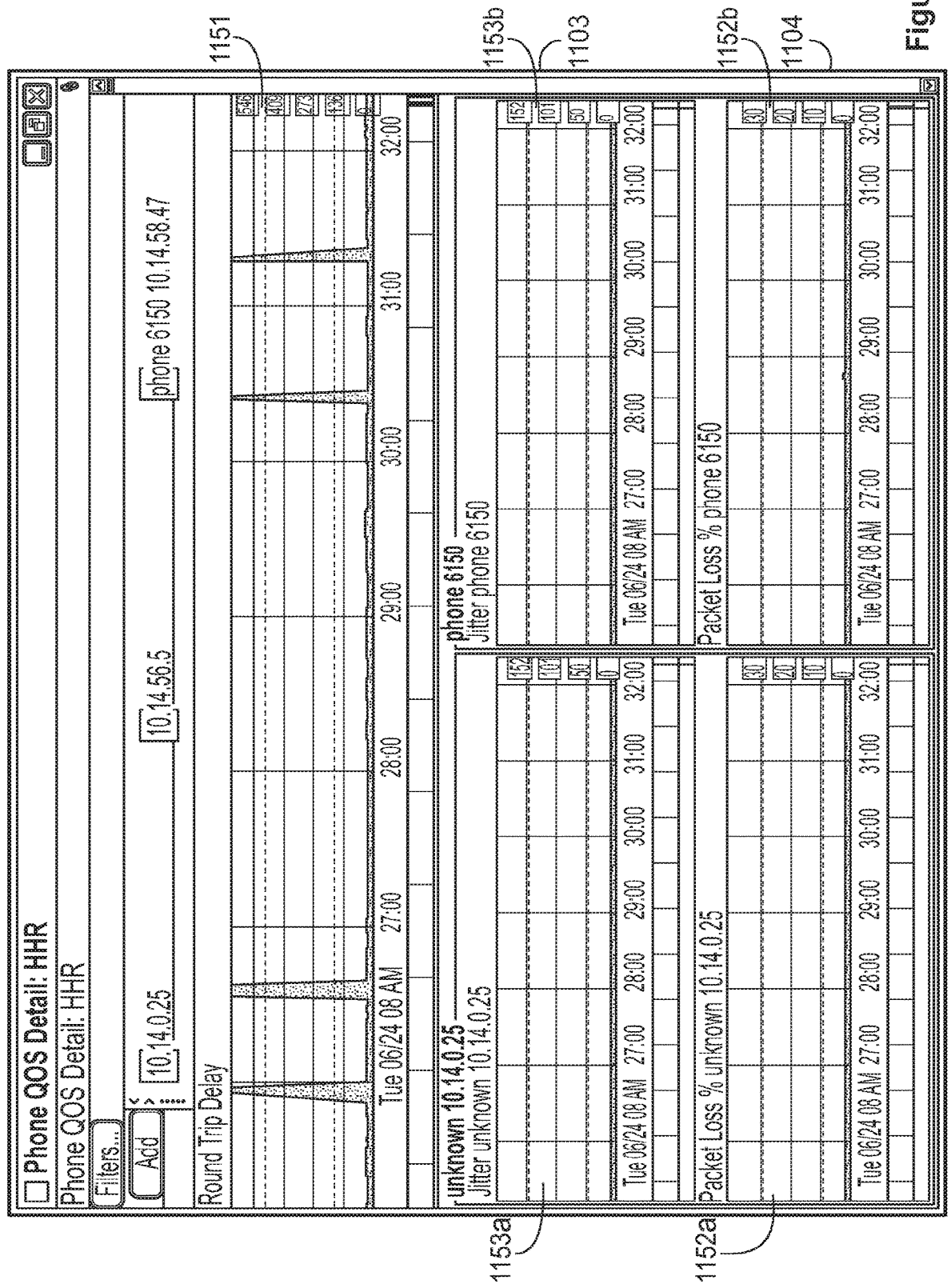
FIG. 11 is an exemplary depiction of a screen display showing QOS detail for one phone traceroute.

FIG. 11 is an exemplary depiction of a screen display showing QOS detail for one phone traceroute, including round-trip delay 1151, packet loss 1152a and 1152b, and jitter 1153a and 1153b. The upper and lower displays, 1103 and 1104 of jitter and packet loss reflect the corresponding metrics at each end of the traced route (e.g., a media processor and a phone).

Figure 12:
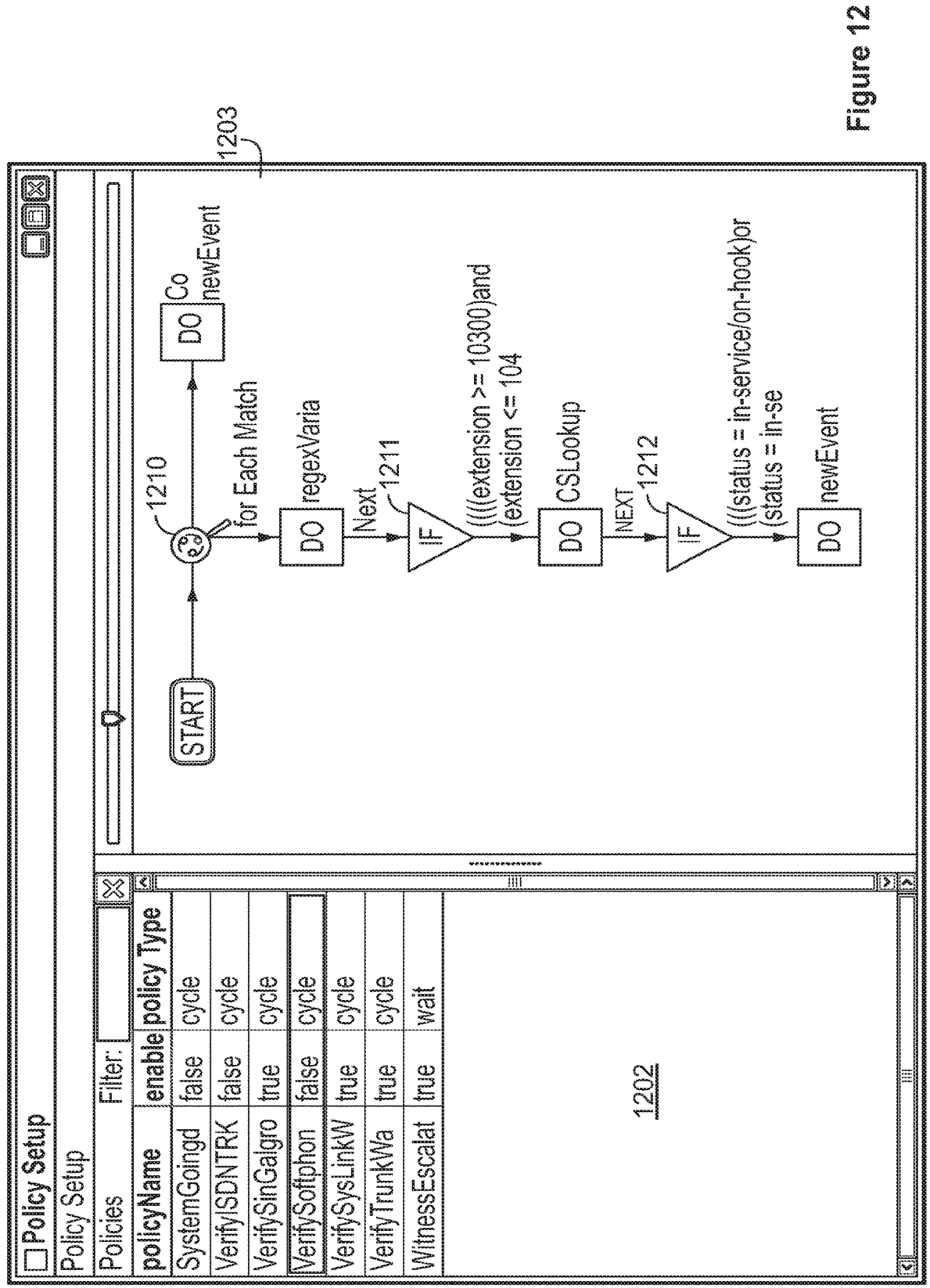
FIG. 12 is an exemplary depiction of a screen display showing a policy setup module.

FIG. 12 is an exemplary depiction of a screen display showing a policy setup module. "Policies" can be put in place to trigger standardized actions based on events, such as reports, event handling, and the like. A policy is programmed as a flow chart and functions in the nature of a script. A policy is authored through GUI controls accessible by mouse (in the example shown, by right-click-accessible menus) in display panel 1203. Each created policy is listed in panel 1202. This screen is reached from the Setup tab 419 in FIG. 4 (Setup→Policy). The policy shown in the displayed flowchart 1210 is for phone recording to "virtual" extensions (because physical phones are not needed for message recording). The policy generates a new event to cancel an event representing a failure for a range of virtual extensions unless, per "IF" conditions 1211, 1212, a status of in-service/on-hook or in-service/offhook is observed, in which case the event is cancelled. The policy causes the active event list to be scanned for softphone failures, and checks to see if the softphone is failed. If not, it sends a new event to cancel the "failed" event. Thus, once established, each policy continuously enforces its specified conditions based on events monitored in real time in accordance with the protocols described in connection with FIG. 2.

Figure 13:
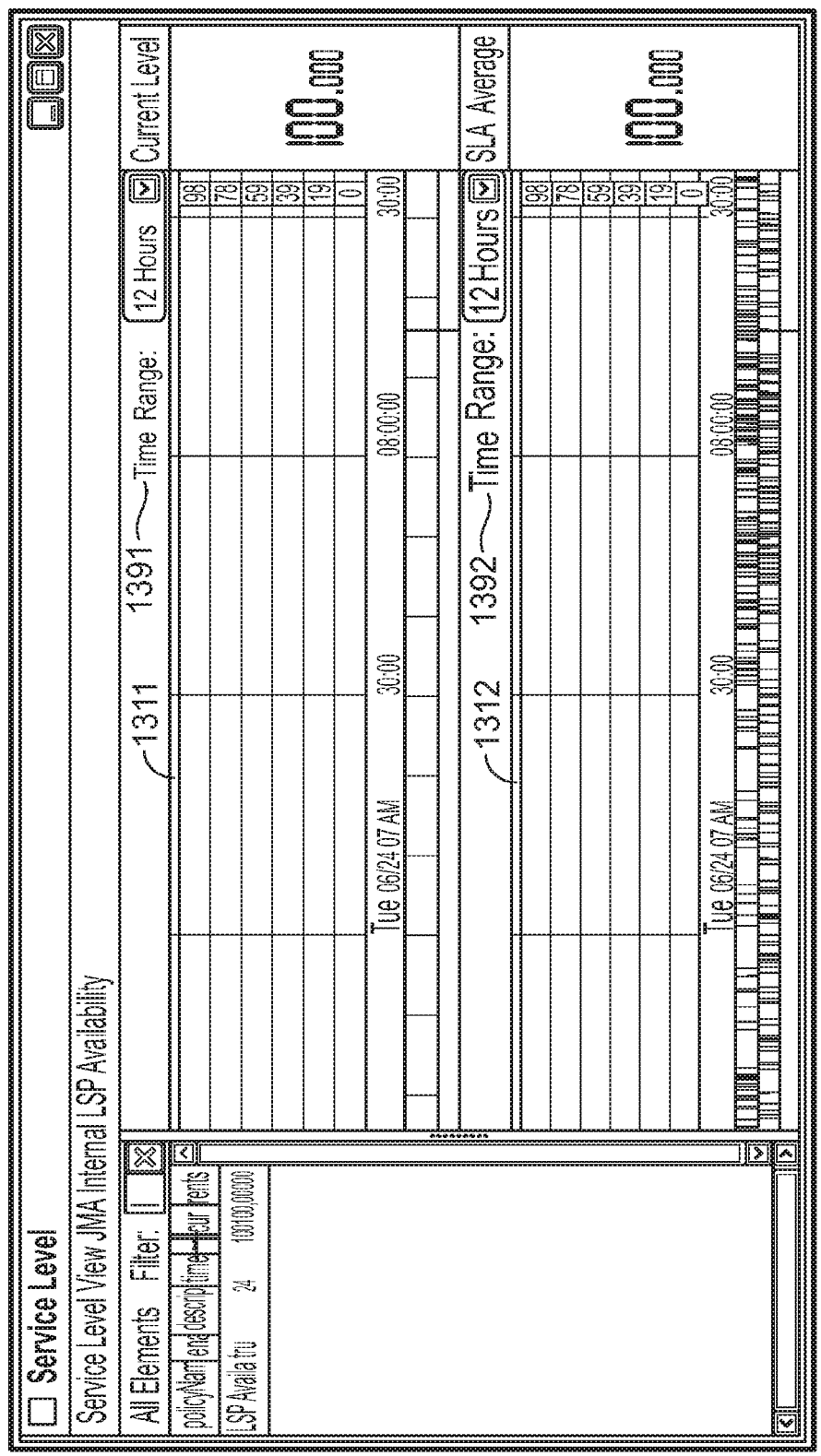
FIG. 13 is an exemplary depiction of a screen display showing current service levels over time, plus a rolling average display.

FIG. 13 is an exemplary depiction of a screen display showing a service level monitor. This display is reachable by clicking View→Service Level starting at the View link 532 in FIG. 5. The display of FIG. 13 can appear in a separate window or in panel 504 of FIG. 5. FIG. 13 shows current service levels (1311) over a time frame selectable by controls 1391, plus a rolling average display 1312 of the monitored service level over the time range (per control 1392), and other information. Again, this display dynamically shows service levels for the monitored network(s) and resource(s) in real time.

Figure 14:
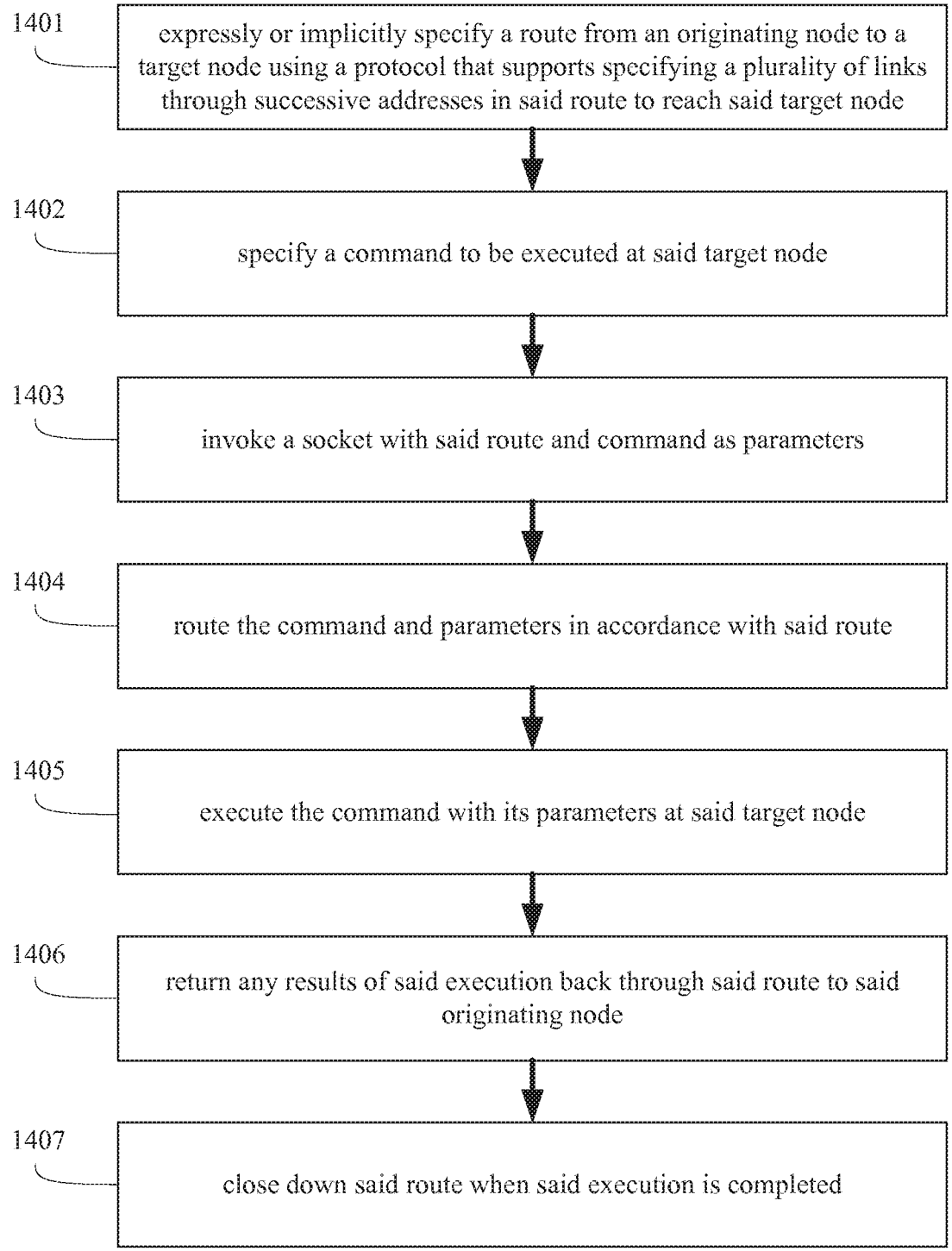
FIG. 14 depicts an exemplary method for routing commands in a modularized software system according to an embodiment.

FIG. 14 depicts an exemplary method for routing commands in a modularized software system according to an embodiment of the disclosure. At 1401, a route is expressly or implicitly specified from an originating node to a target node using a protocol that supports specifying a plurality of links through successive addresses in the route to reach the target node. At 1402, a command is specified to be executed at the target node. At 1403, a socket is invoked with the route and command as parameters. At 1404, the command and parameters are routed in accordance with the route. At 1405, the command is executed with its parameters at the target node. At 1406, any results of the execution are returned back through the route to the originating node. At 1407, the route is closed down when the execution is completed.

It should be apparent that the operational example illustrated in FIGS. 4-13, incorporating the technologies disclosed above in connection with FIGS. 1-3, fully realizes a converged monitoring and management platform provided in the form of a service, that can view events in and/or manage a plurality of disparate networks in the aggregate, or any one of them individually, overcoming obstacles that prevented such a system from being offered in the past, such as addressing conflicts, inability to route within the constituent networks without substantial network changes or undesired additional infrastructure, artifacts arising from remote network measurements and observations, and gaps in knowledge resulting from the lack of continuous connectivity to each managed network.

Although the present disclosure describes a number of embodiments in detail, it should be understood that various changes, substitutions, and alterations may be readily ascertainable by those skilled in the art and may be made herein without departing from the spirit and scope of the present invention as defined by the following claims.

TABLE 1

ComStruc Command Hierarchy

| Command | Further Description |
|---|---|
| Policy | Policy Module |
| policy data | The data repository for policy |
| policy data savenow | Save this data source (in some cases) |
| policy data size | [list_name] get the number of rows in a list |
| policy data list | [list name] print a specific table to the output |
| policy data proxyStream | Advanced query socket |
| policy data describe | List the tables in the repository |
| policy data gxstream | Realtime feed stream interface |
| policy data gxstream connect | table_name |
| policy data importCsv | [list] [filename] Import a CSV file and add it to the list |
| policy data exportCsv | [list] [filename] Export a CSV file from the list |
| policy data clearAll | Clear the server's contents |
| policy data switchAndCopyDataSource | [data source] Switch the data source for this server to this data source |
| policy data proxy | Service connections from the GXProxyServer object |
| policy data proxy query | query a specific table for an index array |
| policy data proxy tableMeta | get the table names in this module |

TABLE 1-continued

ComStruc Command Hierarchy

| Command | Further Description |
| --- | --- |
| policy data proxy tableColumns | [tableName] Get the fields for this table |
| policy data proxy tableEntryMeta | get the table names in this module |
| policy data proxy update | updates an entry in the list |
| policy data proxy entry | gets an entry from the list |
| policy data proxy deleteRow | deletes a row in the server |
| policy data proxy addRow | add an entry to the list |
| policy data oneWayReplicate | The UDP Replication Branch |
| policy data oneWayReplicate list | List the current replication rules |
| policy data oneWayReplicate flushAll | Flush all replicated tables to remote servers |
| policy data oneWayReplicate prepareAll | Send table preperations to remote server |
| policy data oneWayReplicate add | [destination] [port] [module] [tableName] |
| policy data oneWayReplicate remove | [index] |
| policy data oneWayReplicate flushOnly | Flush one of the tables to remote servers |
| policy data implementation | more commands related to the implementation of the lists |
| policy addPolicy | [policyName] [policyType] |
| policy removePolicy | [policyName] |
| policy enablePolicy | [policyName] |
| policy disablePolicy | [policyName] |
| policy addNode | [policyName] [type] [xposition] [yposition] |
| policy addDoNode | [policyName] [type] [xposition] [yposition] |
| policy removeNode | [index] |
| policy moveNode | [index] [x] [y] |
| policy updateConnection | [index ofConnection] [newEndNode connection index] |
| policy addNodeOutput | [policyName] [nodeIndex] |
| policy removeNodeOutput | [policyName] [nodeIndex] [nodeOutputIndex] |
| policy moveNodeOutputParamUp | [policyName] [nodeIndex] [nodeOutputIndex] |
| policy moveNodeOutputParamDown | [policyName] [nodeIndex] [nodeOutputIndex] |
| policy updateNodeOutputParams | [policyName] [nodeIndex] [nodeOutputIndex] [param] [description] |
| policy getPolicyCycleTime | [policyName] |
| policy setPolicyCycleTime | [policyName] [cycleFrequency] |
| policy getParam1Value | [nodeIndex] |
| policy getParam2Value | [nodeIndex] |
| policy getParam3Value | [nodeIndex] |
| policy updateParam1Value | [nodeIndex] [value] |
| policy updateParam2Value | [nodeIndex] [value] |
| policy updateParam3Value | [nodeIndex] [value] |
| policy changeDoNodeType | [policyName] [index] [newType] |
| policy updatePolicyParameter | [index] [value] [valIsVar] |
| policy dispatchCyclePolicy | [policyName] |
| chat | Conet Chat Module |
| chat data | The data repository for chat |
| chat data savenow | Save this data source (in some cases) |
| chat data size | [list_name] get the number of rows in a list |
| chat data list | [list_name] print a specific table to the output |
| chat data proxyStream | Advanced query socket |
| chat data describe | List the tables in the repository |
| chat data gxstream | Realtime feed stream interface |
| chat data gxstream connect | table_name |
| chat data importCsv | [list] [filename] Import a CSV file and add it to the list |
| chat data exportCsv | [list] [filename] Export a CSV file from the list |
| chat data clearAll | Clear the server's contents |
| chat data switchAndCopyDataSource | [data source] Switch the data source for this server to this data source |
| chat data proxy | Service connections from the GXProxyServer object |
| chat data proxy query | query a specific table for an index array |
| chat data proxy tableMeta | get the table names in this module |
| chat data proxy tableColumns | [tableName] Get the fields for this table |
| chat data proxy tableEntryMeta | get the table names in this module |
| chat data proxy update | updates an entry in the list |
| chat data proxy entry | gets an entry from the list |
| chat data proxy deleteRow | deletes a row in the server |
| chat data proxy addRow | add an entry to the list |
| chat data oneWayReplicate | The UDP Replication Branch |
| chat data oneWayReplicate list | List the current replication rules |
| chat data oneWayReplicate flushAll | Flush all replicated tables to remote servers |
| chat data oneWayReplicate prepareAll | Send table preperations to remote server |
| chat data oneWayReplicate add | [destination] [port] [module] [tableName] |
| chat data oneWayReplicate remove | [index] |

TABLE 1-continued

ComStruc Command Hierarchy

| Command | Further Description |
|---|---|
| chat data oneWayReplicate flushOnly | Flush one of the tables to remote servers |
| chat data implementation | more commands related to the implementation of the lists |
| chat chatConnection | [userId] |
| InfoSpot | The server information hub |
| InfoSpot Site | Get the configured site for this server |
| InfoSpot Customer | Get the configured customer for this server |
| InfoSpot Description | Get the configured description for this server |
| InfoSpot Reload | Reload the properties from the file |
| InfoSpot SetProp | [key] [value] set an info spot property and save it to file |
| InfoSpot GetProperty | [key] get the value of the property |
| InfoSpot StartConnection | Start (or restart) the connection to mother |
| permission getOrg | get the organization this user is in |
| permission getAuthentication | [username] [password] get the authentication for this cluster system |
| permission add | Add a new user/group |
| permission add user | [username] [password] |
| permission add group | [groupname] |
| permission remove | Remove user/group |
| permission remove user | [username] |
| permission remove group | [groupname] |
| permission change | Remove user/group |
| permission change org | [username] [organization] |
| permission removeGroup | [index] |
| permission addGroupToUser | [username] [group] |
| permission removeGroupFromUser | [index] |
| permission permit | Permit user/group access to command |
| permission permit user | [username] [command] |
| permission permit group | [groupname] [command] |
| permission deny | Deny user/group access to command |
| permission deny user | [username] [command] |
| permission deny group | [groupname] [command] |
| permission groupadd | [groupname] [username] |
| tools | Tools used for server administration |
| tools restart | Restart the server |
| tools machineRestart | Restart the entire machine |
| tools MyName | Return the name of the server hosting this ComStruc |
| tools MyIP | Returns the ip address of this server |
| tools MyPhys | Returns the physical address of this server |
| tools tail | [filename] Tail a log file |
| tools memProfile | Shows the memory profile for this server |
| tools localConnect | [destination] [port] |

The invention claimed is:

1. A method for monitoring network information from a plurality of different networks, the method comprising:

receiving, by a target in a local network, a connection message from a client in a different network via a communications protocol that expressly or implicitly specifies a route from the client to the target by specifying a plurality of links through successive addresses in said route between the client and the target;

in response to the connection message, the target listening for a request from the client via the communications protocol for a track change request comprising a search filter;

in response to receiving the track change request, the target using the search filter to query a data server in the local network and obtain responsive network information;

using, by the target, the communications protocol to transmit the responsive network information to the client;

receiving, by the target, a database update request, the database update request indicating a request to update data in the data server;

comparing the database update request to the search filter to determine if matching information is in the database update request; and in response to finding matching information, the target using the communications protocol to send the matching information to the client.

2. The method of claim 1 wherein the data server forwards the database update request to the target.

3. The method of claim 1 wherein the search filter indicates at least one column in a database of the data server that is to be searched.

4. The method of claim 1 further comprising the target using the communications protocol to send progress information to the client in connection with transmitting the responsive network information to the client.

5. The method of claim 1 wherein the target is a gateway computer of the local network.

6. A non-transitory computer-readable media for monitoring network information, the computer-readable media comprising instructions configured to cause a target computer in a local network to:

receive a connection message from a client computer in a different network via a communications protocol that expressly or implicitly specifies a route from the client computer to the target computer by specifying a plurality of links through successive addresses in said route between the client computer and the target computer;

in response to the connection message, listen for a request from the client computer via the communications protocol for a track change request comprising a search filter;

in response to receiving the track change request, use the search filter to query a data server in the local network and obtain responsive network information;

use the communications protocol to transmit the responsive network information to the client computer;

receive a database update request, the database update request indicating a request to update data in the data server;

compare the database update request to the search filter to determine if matching information is in the database update request; and in response to finding matching information, use the communications protocol to send the matching information to the client.

7. The non-transitory computer-readable media of claim 6 wherein the data server forwards the database update request to the target.

8. The non-transitory computer-readable media of claim 6 wherein the search filter indicates at least one column in a database of the data server that is to be searched.

9. The non-transitory computer-readable media of claim 6 further comprising instructions configured to cause a target computer in a local network to use the communications protocol to send progress information to the client computer in connection with transmitting the responsive network information to the client computer.

10. The non-transitory computer-readable media of claim 6 wherein the instructions are configured for a gateway computer of the local network.

* * * * *